(12) United States Patent
Molstad et al.

(10) Patent No.: US 6,542,321 B1
(45) Date of Patent: Apr. 1, 2003

(54) BIDIRECTIONAL READ-WHILE-WRITE DATA RECORDING SYSTEM

(75) Inventors: Richard W. Molstad, St. Paul, MN (US); Tim T. Ngo, Burnsville, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/474,360

(22) Filed: Dec. 29, 1999

(51) Int. Cl.⁷ .................................................. G11B 5/17
(52) U.S. Cl. ............................................ 360/31; 360/25
(58) Field of Search ..................... 360/31, 25, 121, 360/317, 318

(56) References Cited

U.S. PATENT DOCUMENTS

| | | | |
|---|---|---|---|
| 5,122,916 A | * | 6/1992 | Aranovsky ................. 360/124 |
| 5,293,369 A | | 3/1994 | Melas et al. |
| 5,331,493 A | | 7/1994 | Schwarz |
| 5,398,146 A | * | 3/1995 | Draaisma .................... 360/128 |
| 5,541,793 A | | 7/1996 | Schwarz |
| 5,640,753 A | | 6/1997 | Schultz et al. |
| 5,668,689 A | | 9/1997 | Schultz et al. |

* cited by examiner

*Primary Examiner*—David Hudspeth
*Assistant Examiner*—Varsha A. Kapadia
(74) *Attorney, Agent, or Firm*—Eric D. Levinson (57) ABSTRACT

A magnetic tape recording system employing a single bump read-while-write head, methods of minimizing crossfeed signals between the read and write channels of magnetic tape recording systems, and electronic circuitry to implement such methods.

34 Claims, 11 Drawing Sheets

BIDIRECTIONAL READ-WHILE-WRITE DATA RECORDING SYSTEM

TECHNICAL FIELD

This invention concerns magnetic tape recording systems that utilize simplified read-while-write heads and electronics to compensate for undesired electronic signals produced by the heads.

BACKGROUND

In data recording systems, a very desirable feature is the ability to immediately verify the accuracy of just-written data, a capability known as "read-while-write" or RWW. It is typically accomplished in magnetic tape recording systems by constructing a recording head to minimize the reception of the write signal by the adjacent read head. Two conventional approaches to this are, first, to physically separate the read and write heads by distances of more than about 1 mm for heads using the signal strengths typically required for conventional tape coercivities; and second, to interpose magnetic shielding materials between the heads.

Both of these approaches are technically effective, in part because they "fix the problem at the source," but they increase the complexity of the head design and manufacture, and thus the cost of the head. In particular, mechanical assembly of the head is difficult. Also, the resultant head presents a "double bump" contour to the tape, which is more difficult to manufacture than "single bump" designs. The result is that known practical RWW heads are more than twice as expensive to manufacture as non-RWW single bump heads.

In this document, consistent with the known art, the term "single bump" refers to a head contour in which the tape and head physically contact each other in substantially a single region. The term "double bump" refers to a head contour in which there is a region of substantial non-contact between the tape and head, lying between two regions of physical tape/head contact.

DISCLOSURE OF INVENTION

One aspect of the invention is a single bump RWW magnetic recording head. Specifically, the head comprises a substrate, a film stack on the substrate, and an encasing material surrounding the film stack. The film stack comprises a plurality of pole and shield materials and at least one magnetoresistive MR) element, arranged within the film stack to define a single bump contour comprising at least one RWW channel. Each RWW channel comprises at least one write gap, at least one MR read gap, and a total of at least three total read and write gaps per RWW channel.

Another aspect of the invention is a magnetic recording system employing electronic circuits designed to eliminate undesired crossfeed signals that may arise between the read and write channels of such systems, including (but not limited to), systems employing the inventive single bump RWW magnetic recording head.

Yet another aspect of the invention is a method of eliminating undesired crossfeed signals in a magnetic data recording system, especially (but not necessarily) those that employ the inventive single bump RWW magnetic recording head.

DETAILED DESCRIPTION

Figure 1:
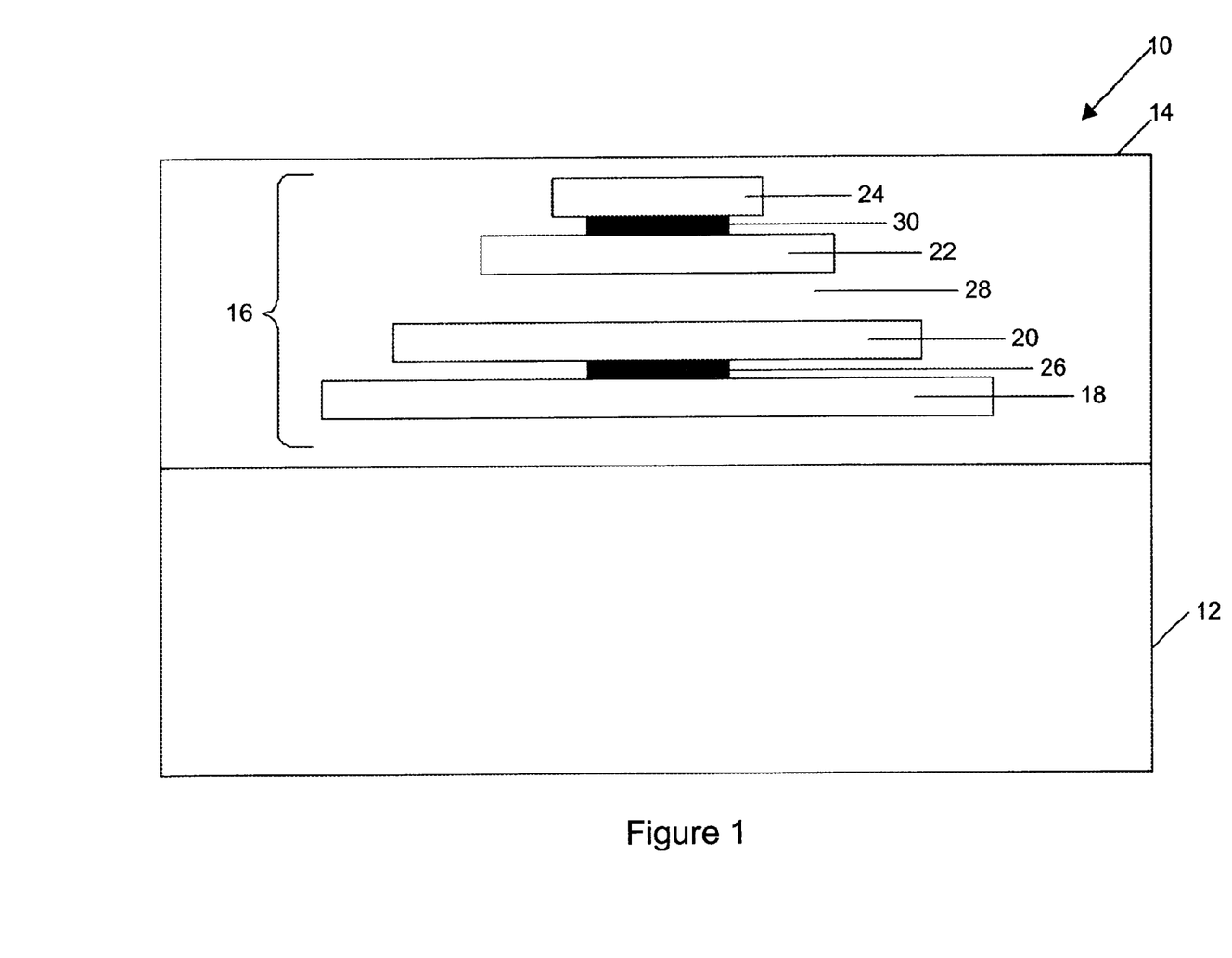
FIGS. 1–3, 4A–4B, and 5 are schematic views of embodiments of the recording head aspect of the invention.

FIG. 1 is a schematic view of a preferred embodiment of the recording head aspect of the invention. For purposes of illustration only, a single RWW channel embodiment will be shown, but the scope of invention includes multi-RWW channel embodiments.

The preferred embodiment employs known principles from the art of shared pole thin-film magnetoresistive MR) head elements. In distinction from the prior art, however, is an additional MR element next to the write elements, and the arrangement of all the elements of the head is such that a single bump head is produced. Specifically, FIG. 1 shows head 10 as comprising substrate 12 and encasing material 14, within which is head film stack 16. Head film stack 16 comprises three conventional layers of pole material 18, 20, and 22; and also the additional pole material 24. Conventional first MR material 26 and write gap 28, along with the additional MR material 28 that forms the second, non-conventional read head, are interspersed in the film stack 16 between the various pole materials 18, 20, and 22.

Suitable materials for substrate 12 include aluminum titanium oxide, barium titanium oxide, calcium titanium oxide, nickel-zinc ferrite, and manganese-zinc ferrite. Suitable materials for encasing material 14 include alumina, silicon oxide, silicon dioxide, and silicon nitride. Suitable MR materials include any known MR or giant magnetoresistive (GMR) material. The preferred embodiment of FIG. 1 may be assembled in a variety of ways. The preferred method is to use chemical mechanical polish (CMP) techniques to planarize the surface of the write element 22 for addition of MR element 30. The preferred embodiment of FIG. 1 minimizes the write-to-read gap separation distance, and also takes advantage of the low errors possible in lithographic alignment techniques to produce a low inherent track center-line tolerance. It is also believed that the preferred embodiment of FIG. 1 would have a low manufacturing cost.

Figure 2:
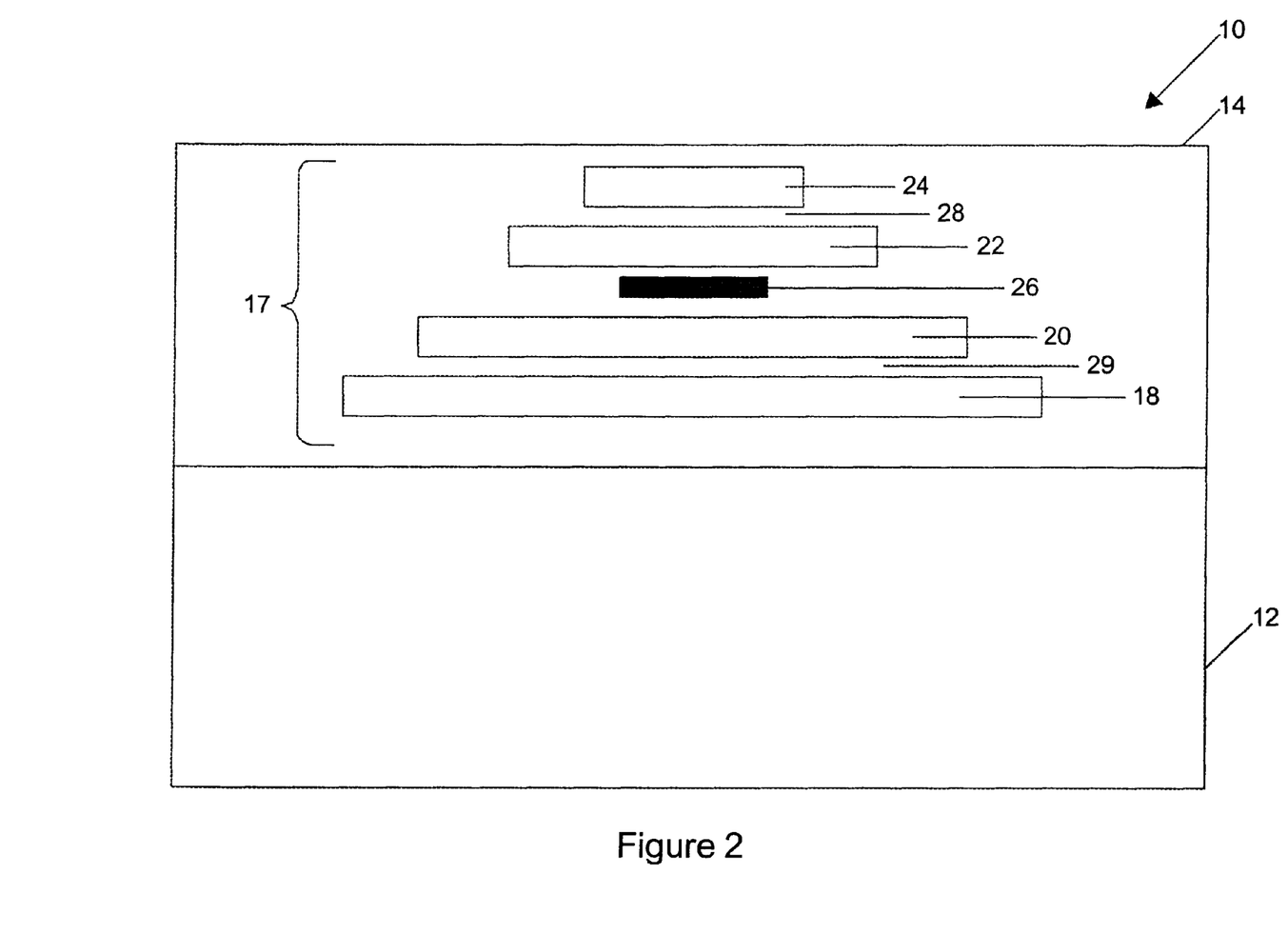

The embodiment of FIG. 2 is not as preferred as the embodiment of FIG. 1 because it would be more difficult to manufacture. In this embodiment, film stack 17 comprises a single MR element 26 and two write gaps 28 and 29, along with other features as present in the embodiment of FIG. 1.

The embodiments of FIGS. 1 and 2 employ shared poles (sometimes known as a "merged" configuration), but the complementary arrangement (known by various names such as "piggyback" is also within the scope of the invention and will be understood by those skilled in that art after consideration of FIGS. 1 and 2. It is also possible to combine the teachings of this invention with the configurations disclosed and claimed in U.S. Pat. No. 5,331,493 (Schwarz) and U.S. Pat. No. 5,541,793 (Schwarz), although it is not necessary to include the hard block between the read and write elements as taught by Schwarz; the entire disclosure of each of the Schwarz patents is incorporated by reference into this document.

Figure 3:
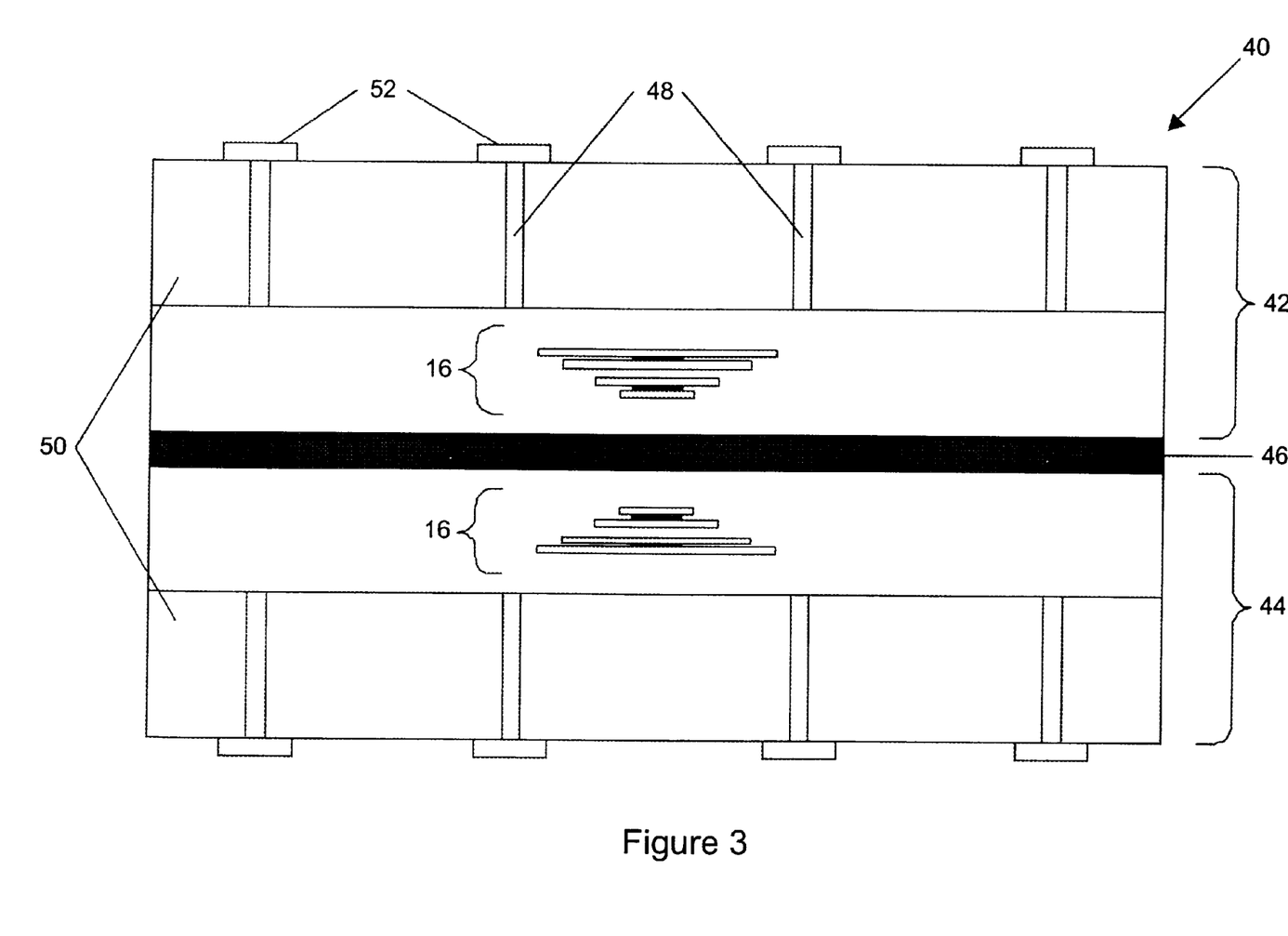

Similarly, the embodiment of FIG. 3 is not as preferred as the embodiment of FIG. 1, but is still within the scope of the invention. This embodiment is achieved by producing head assembly 40 from two conventional thin-film magnetoresistive heads 42 and 44. For example, one possible assembly technique is to bond the two conventional heads 42 and 44 together face to face with adhesive 46. In this embodiment, signal leads (not shown) are taken from individual bonding areas 52 through vias 48 in the substrates 50, and then to the back sides of the assembly (the two vias 48 and two bonding areas 52 identified are each typical of the eight shown). The embodiment of FIG. 3 uses the configuration of film stack 16 of FIG. 1, but it is equally within the scope of the invention to use the configuration of the film stack 17 of FIG. 2. And, as before, "merged pole" and "piggyback" configurations for the film stacks are also within the scope of the invention.

Figure 4A:
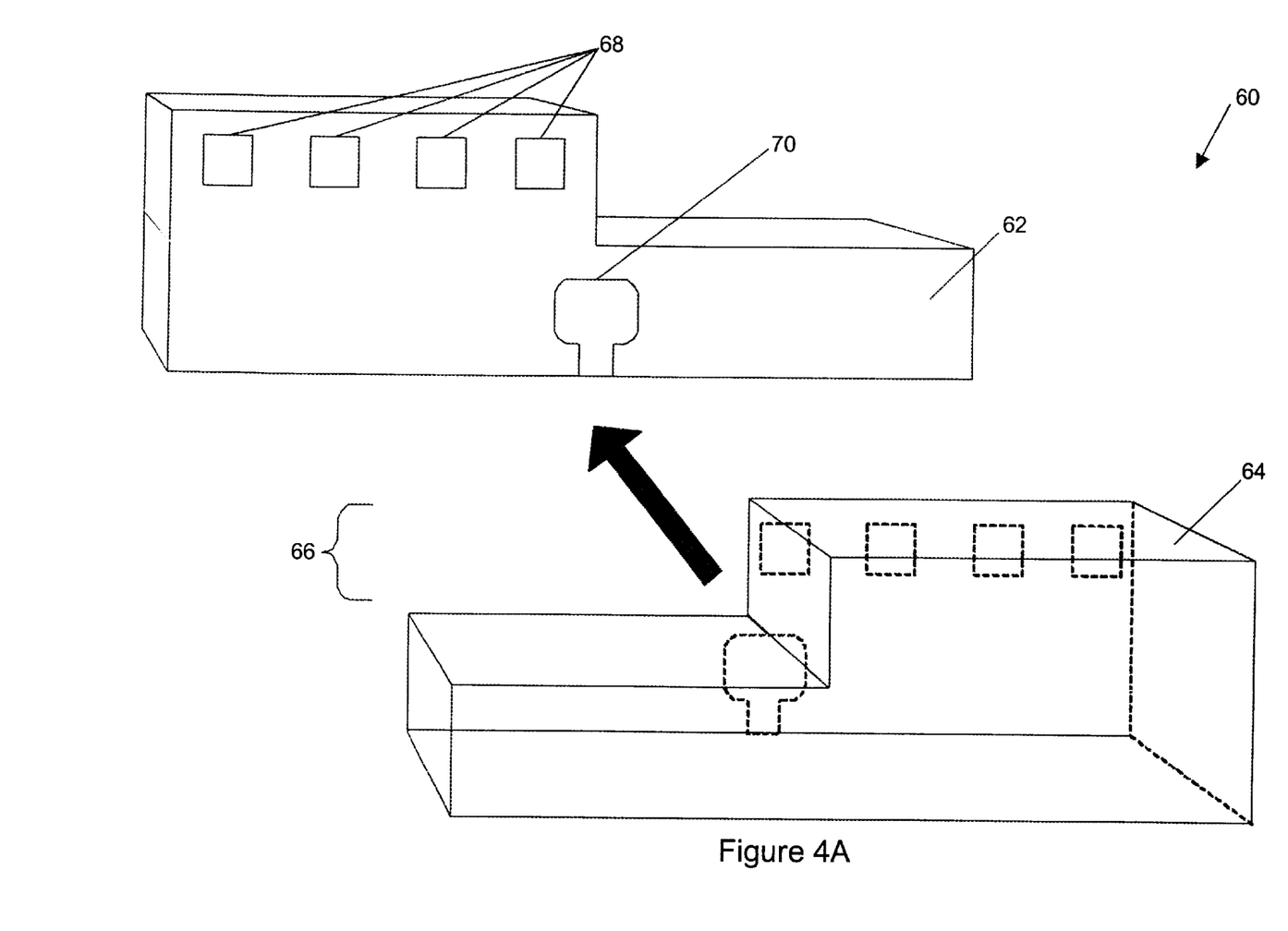
Figure 4B:
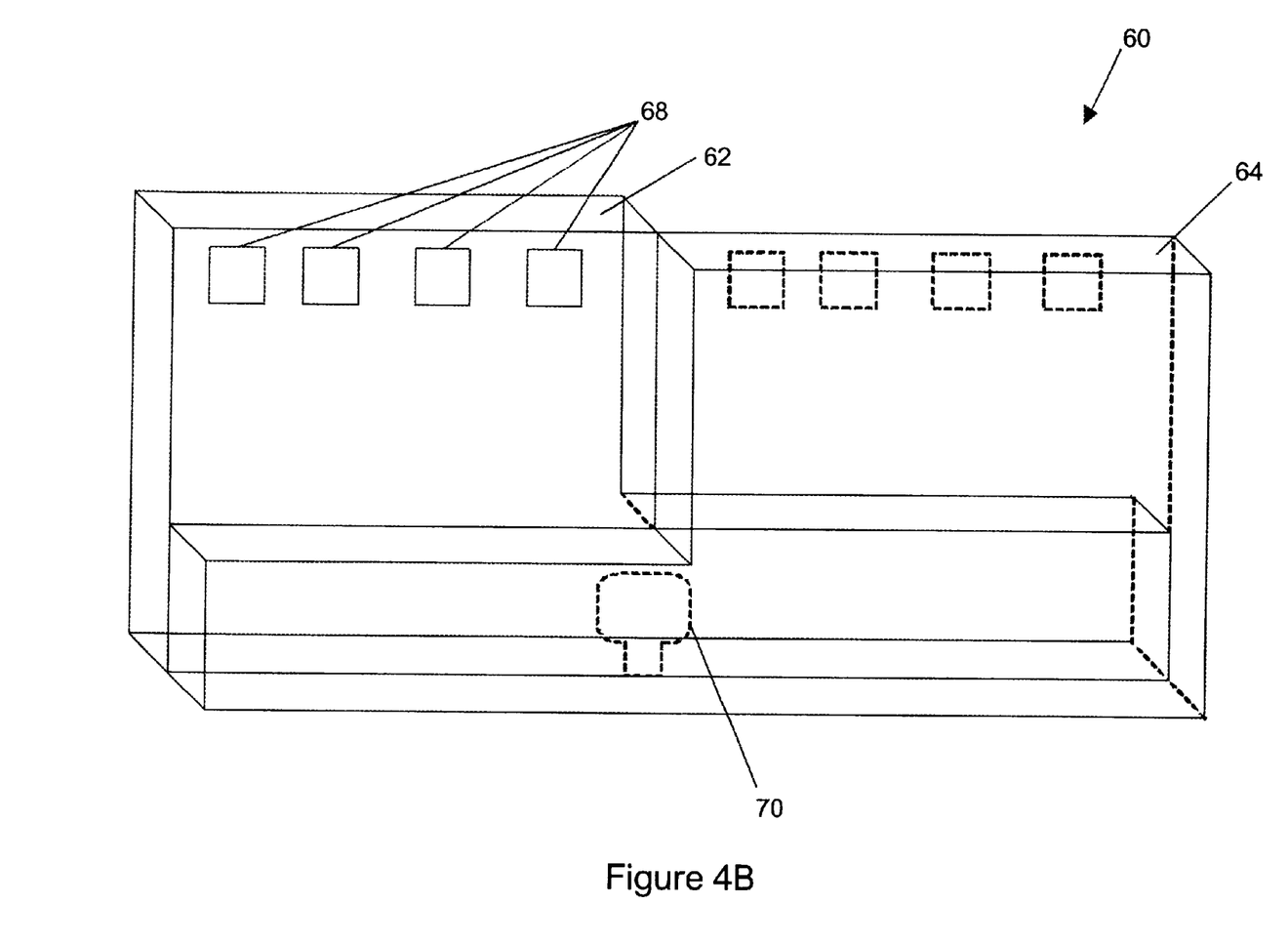

An alternative embodiment, as shown in FIGS. 4A and 4B, is also not as preferred as the embodiment of FIG. 1, but is also within the scope of the invention. This embodiment is an assembly 60 of two matched portions 62 and 64. Each of the matched portions, such as portion 64, includes at least one notch 66 to expose bonding pads 68 on the other matched portion, 62. The bonding pads 68 are then electrically connected to the various recording gaps in recording region 70 by conventional internal connections (not shown). The remainder of the assembly 60 is conventional in manufacture, and bonding pads 68 may be produced in any manner known in the art. The four identified are typical of the eight shown, including the four shown in phantom on the back side of portion 64).

For any of the head designs above, even the non-preferred embodiments, it is preferred to eliminate undesired crossfeed signals between the read and write channels. Within the construction of the head, this would be accomplished by use of any or all of the following: thin shield layers between the read and write gaps, introduced in the process of manufacturing the head; careful lead layout techniques, such as overlapping current conductors and other signal lines, both in the head and on any flexible circuitry connecting the head to the remainder of the system, to reduce electromagnetic coupling between the read and write channels; and well-designed or chosen printed circuit board connectors and layouts.

Figure 5:
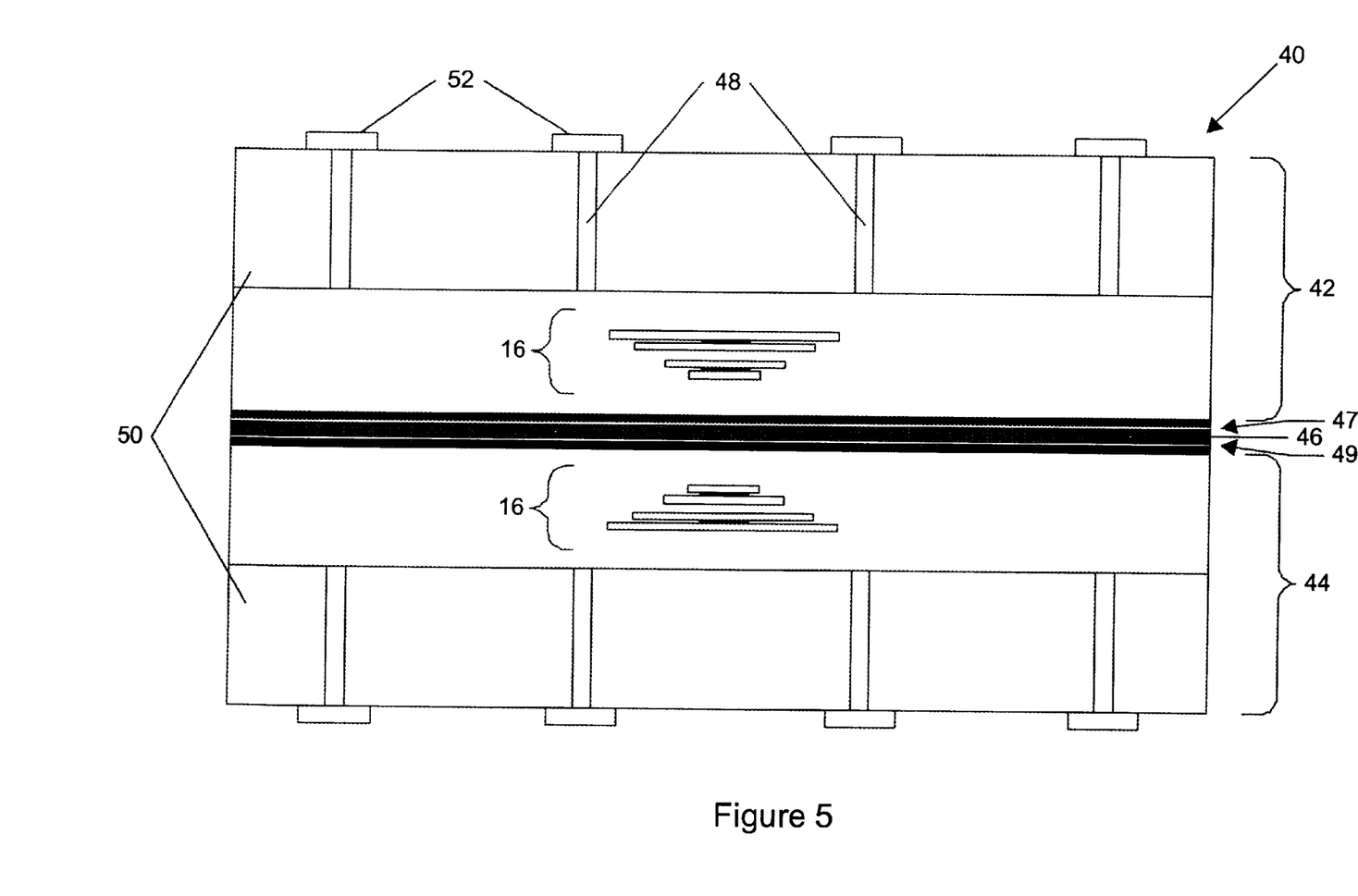

For example, in an embodiment such as that of FIG. 1, shields (not shown) would be inserted at the interfaces of gap 28 and the immediately adjacent layers. FIG. 5 shows schematically the embodiment of FIG. 3 but including additional shields 47 and 49 embedded within the surface of adhesive 46 to reduce interference between the two sides of the combination. Such shields could also be placed at the interfaces between adhesive 46 and heads 42 and 44. The embodiment of FIG. 5 could also include shields as just described for the embodiment of FIG. 1.

Figure 6:
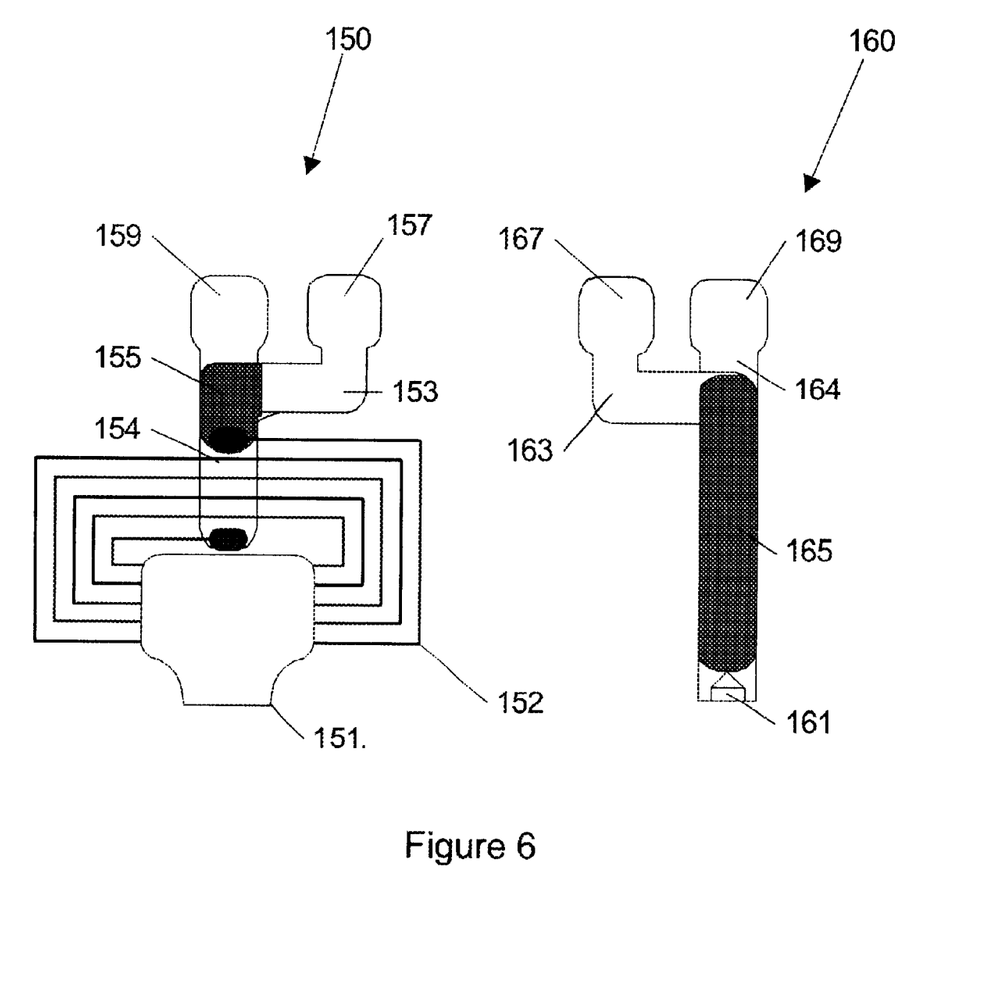
FIG. 6 is a schematic representation of the recording head aspect of the invention.

In another example, FIG. 6 is a schematic representation of a write element 150 and a MR read element 160. Write element 150 comprises writer 151, coil 152, top write contact 153 connected between coil 152 and a first bonding pad 157, and bottom write contact 154 connected similarly connected to a second bonding pad 159. Top write contact 153 and bottom write contact 154 are in different planes parallel to the plane of the Figure, and therefore form between themselves a write current conductor overlap region 155, the volume of which would be filled with an insulator. Similarly, MR read element 160 comprises MR element 161, top read contact 163 connected between the MR element 161 and a third bonding pad 167, and bottom read contact 164 similarly connected to a fourth bonding pad 169. As before, top read contact 163 and bottom read contact 164 are in different planes parallel to the plane of the FIG., and therefore form between them a read overlap region 165, the volume of which would also be filled with an insulator.

An essential requirement for minimization of crossfeed is the maintenance of a linear combination of the valid read channel signal and the interfering write channel signal at the receiver connected to the head. This means that preamplifier circuits as well as the head itself must not be overloaded with the write crossfeed signal, or else the non-linearity of the overloaded signal will make separation of the crossfeed signal impossible. Reduction of overload also has the advantage of reducing the cost of the A/D converter required.

Figure 7:
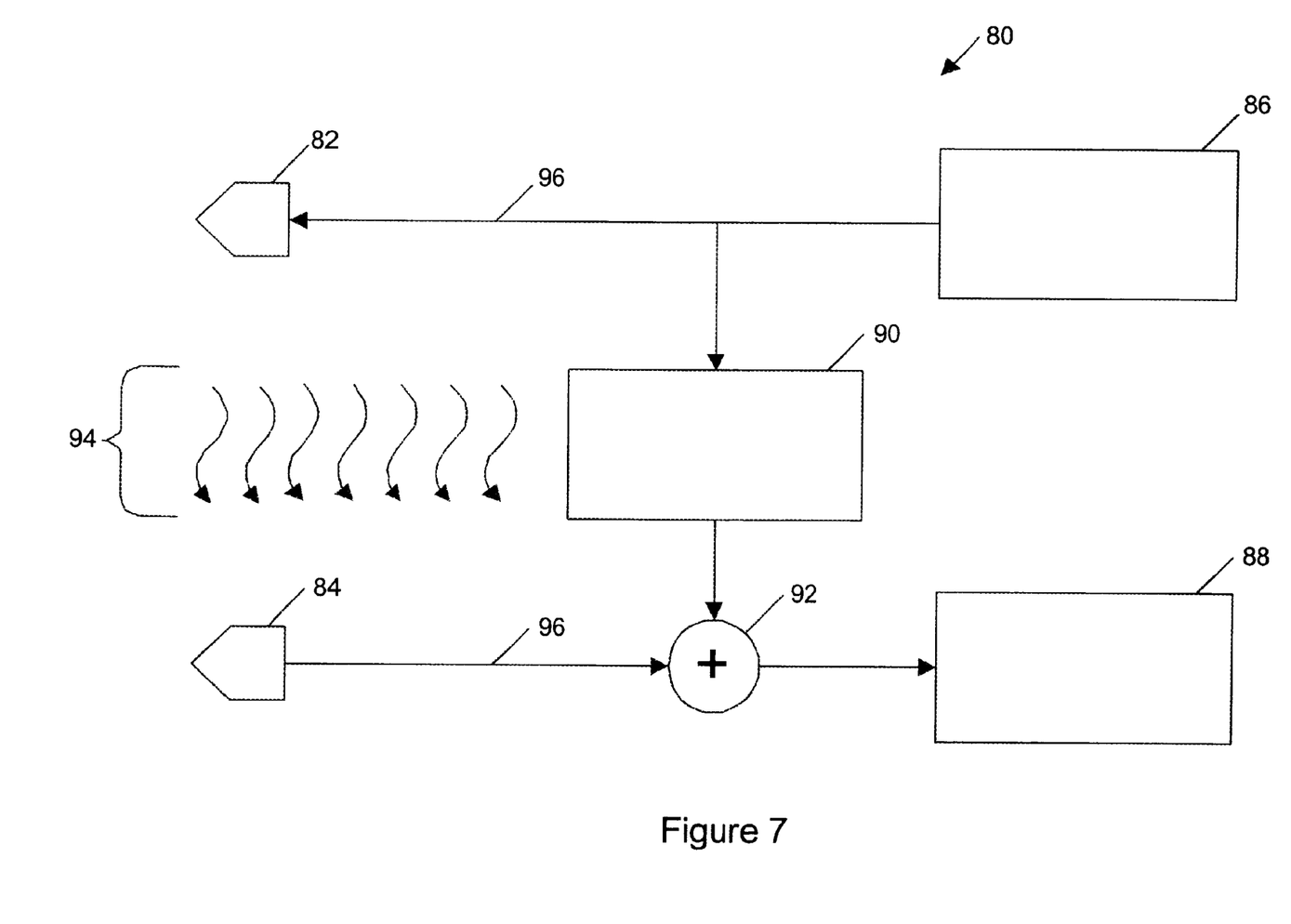
FIG. 7 is a conceptual representation of the model for crossfeed signals which underlies the circuitry aspect of the invention.

FIG. 7 is a conceptual representation of the model for crossfeed signals that underlies the circuitry aspect of the invention. This model should be understood to apply to either analog or digital signals, in accordance with principles known in the art. Thus, the terms "signal" and "data" will be used interchangeably, and both should be understood to apply to either analog or digital representations of information. The model includes a complete recording circuit 80, which comprises write head 82, read head 84, write driver 86, receiver 88, crossfeed simulator 90, and adder 92, all connected as indicated in the Figure. In this model, the crossfeed signal 94 comprises capacitively and inductively coupled components from the region of heads 82 and 84, the flexible circuit 96, and the remainder of the system. Knowledge of the exact form of the crossfeed interference permits an emulated signal, derived from the interfering write channel signal or data, to be subtracted from the composite signal, leaving only the desired valid read channel signal for further processing. This is accomplished by crossfeed simulator 90, which is triggered by the presence of a signal in the write channel to send the inverse of the crossfeed interference into adder 92, thus canceling crossfeed signal 94 out of the read channel prior to receiver 88.

It is assumed that after cancellation, the level of crossfeed signal in the resultant composite read signal should be on the same order of magnitude as the random sources of noise in the signal. Therefore, the simulator 90 should emulate the crossfeed signal 94 to an error of less than 3%. Although the most general scope of the invention includes either analog or digital circuitry, this level of accuracy is preferably met though use of a digital receiver.

Furthermore, in accordance with known data recording techniques (see, for example, U.S. Pat. No. 5,293,369 of Melas et al., the entire disclosure of which is incorporated here by reference), the read channel should sample asynchronously with respect to the read timing, and the read timing should then be recovered after sampling. The preferred embodiment to accomplish this task is an interpolator filter using a modified FIR (finite impulse response) filter structure. This embodiment uses the time base of the write signal to sample the read preamplifier signal, thus enabling the crossfeed signal to be uniformly and consistently sampled.

Figure 8:
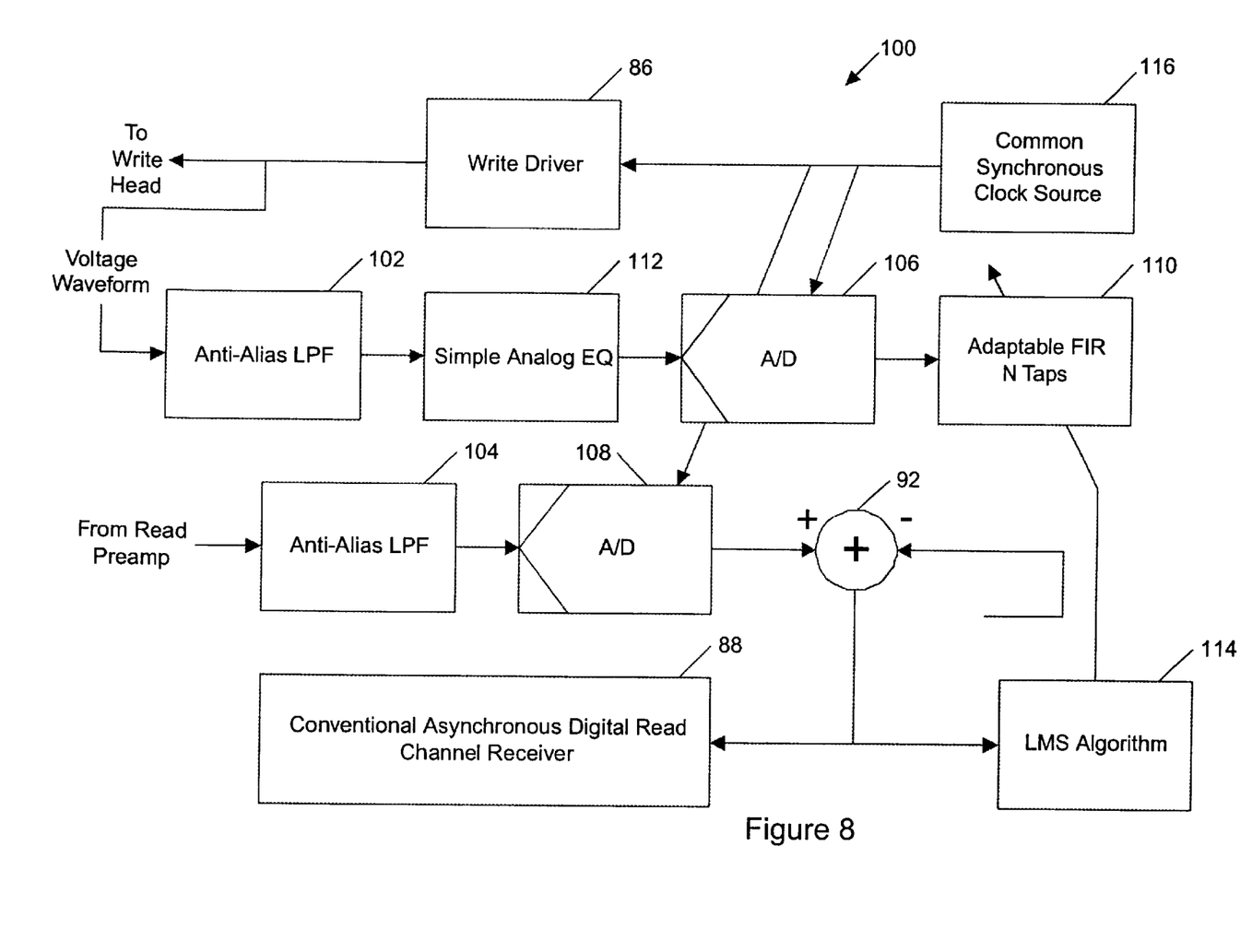
FIGS. 8–10 are schematic views of embodiments of the circuitry aspect of the invention.
Figure 10:
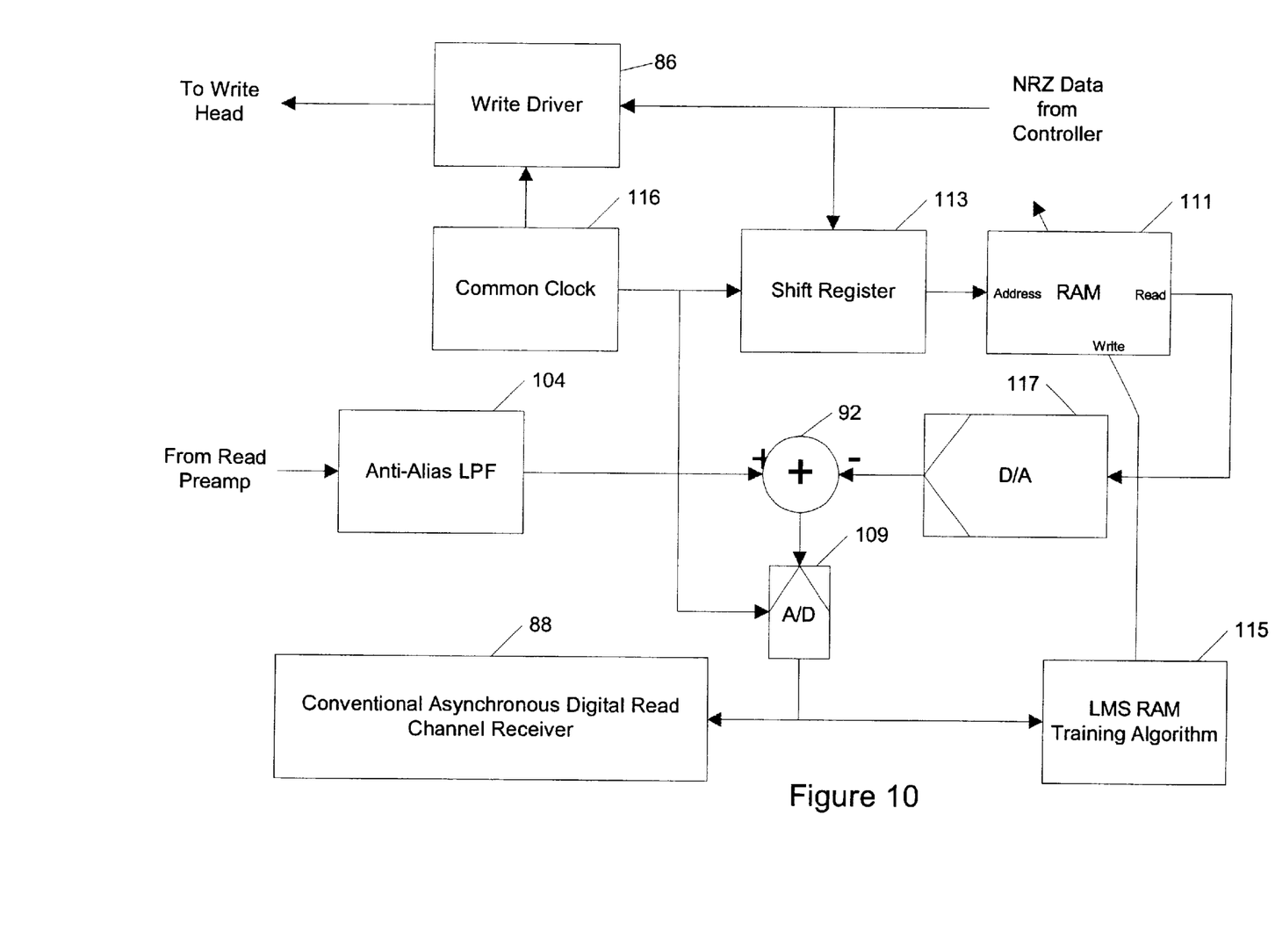

FIG. 8 is a conceptual block diagram of an embodiment of a crossfeed canceling receiver 100 in the context of the model of FIG. 10. It comprises conventional anti-alias low pass filters 102 and 104, A/D converters 106 and 108, asynchronous digital read channel receiver 88, and adder 92. Both the read signal from the read preamplifier and the voltage (or current) waveform presented to the write head are filtered and converted from analog to digital form. In an optional but preferred embodiment, the write waveform may additionally be equalized in some simple analog manner before conversion to simplify the digital FIR filter; as shown, this is accomplished by equalizer 112. The write signal next flows to an adaptable FIR filter 110 where the sampled and filtered write waveform is transformed into the duplicate of the crossfeed signal. The tap weights are adjusted by a standard least mean squares LMS) algorithm 114 when the tape is stopped and thus only the crossfeed signal, and not any valid read signal component, is present. Timing of receiver 100 is controlled by a common synchronous clock 116.

Figure 9:
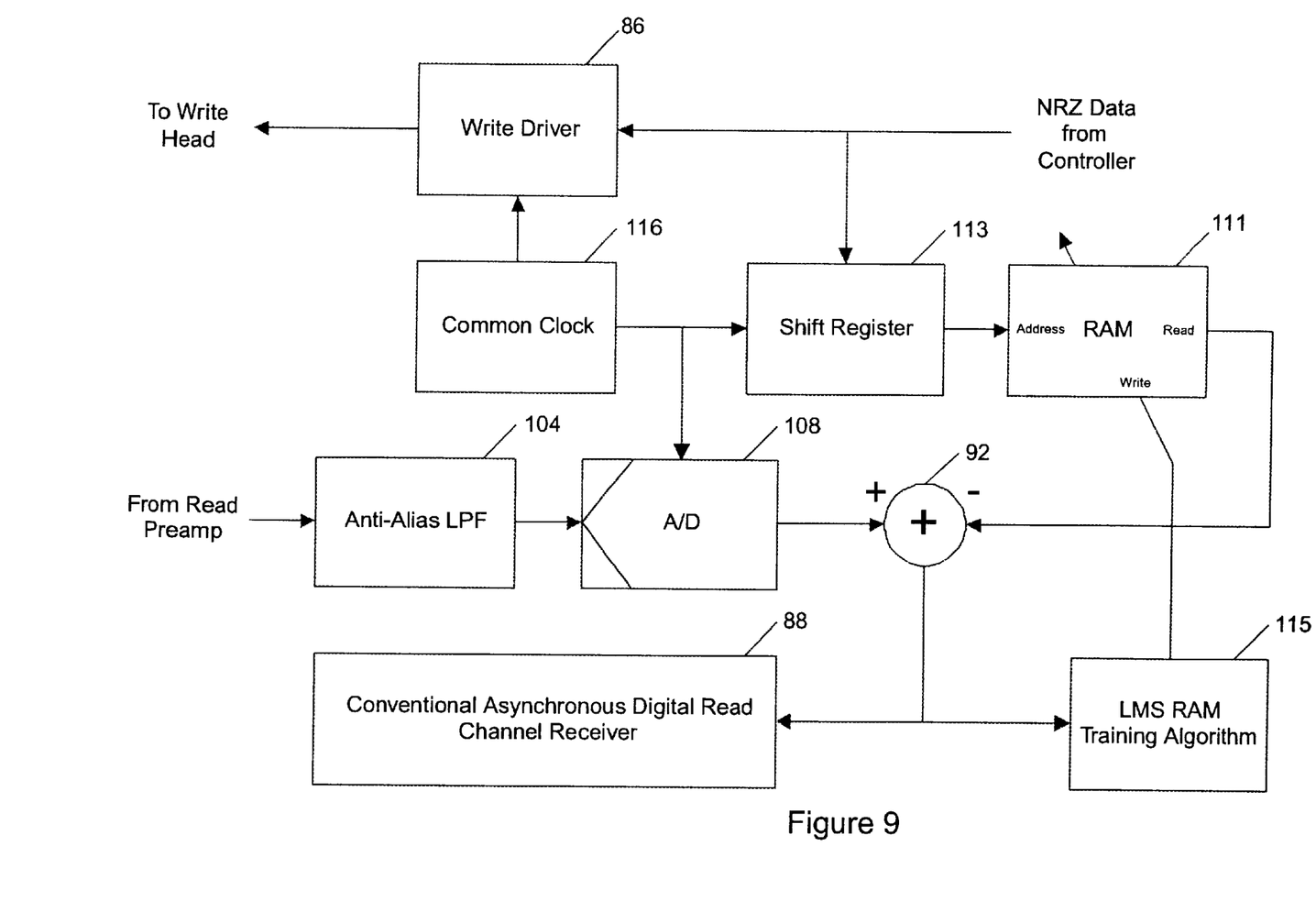

FIG. 9 shows the most preferred form of the embodiment of FIG. 8. As noted above, a preferred embodiment of the invention employs a digital input signal. Thus, random access memory (RAM) 111 may be used to replace the FIR filter 110, as is known from the art of decision feedback equalization (DFE) data receivers. For every sample time and for every data pattern, there is only one digital value for the interference waveform and therefore only one value for its inverse. The input to shift register 113 is assumed to be a NRZ representation of the data so that the correct polarity can be assumed. The stored values in the RAM 111 are found from the LMS algorithm 115, which converges accurately if enough data patterns are examined and the step size parameter is optimized.

FIG. 10 shows a variation of FIG. 9, in which the summation takes place in the analog domain, i.e., before A/D converter 109, and thus D/A converter 117 is added between RAM 111 and adder 92. This embodiment is preferred when reducing integrated circuit area is desired. The dynamic range of A/D converter 109 is reduced by the amount of the crossfeed signal, assuming that the latter is about the same amplitude as the signal itself; thus, addition of the crossfeed signal doubles the dynamic range requirements of the A/D converter, which may increase its required area by more than the amount required for D/A converter 117. A similar advantage of this embodiment is that an analog form of adder 92 is typically smaller than a digital form.

Another possible embodiment simultaneously employs multiple parallel channels in the recording head. In this embodiment, there would be multiple recording regions, each with read and write gaps as described above; thus, a given channel's write signal may not be the only write signal interfering with the corresponding read channel. Thus, multiple RAMs and multiple write signal feeds may be used on each channel. The size (wordwidth) of the RAM for each of these secondary crossfeed signals may be smaller than the primary RAM, assuming that the interfering signal is smaller and therefore there is no need to resolve the simulation to a finer degree than the noise level of the system itself. For example, if the primary RAM wordwidth is 7 bits and the adjacent channel crossfeed is 6 dB lower than the same channel crossfeed, then the adjacent RAM canceler's wordwidth need be only 6 bits.

We claim:

1. A magnetic tape recording system, comprising:
   a) a write channel;
   b) a read channel carrying a linear composite signal of a valid read channel signal and an interfering write channel signal;
   c) a simulator of a crossfeed signal derived from the interfering write channel signal, the simulator triggered by the presence of a signal on the write channel; and
   d) an adder which combines the composite signal and an inverse of a simulated crossfeed signal to produce the valid read channel signal.

2. The system of claim 1, further comprising a magnetic recording head having a single bump contour comprising at least one read-while-write (RWW) channel, each RWW channel comprising at least one write gap, and at least one MR read gap, and a total of at least three total read and write gaps per RWW channel.

3. The system of claim 2, in which the head further comprises overlapping current conductors to reduce electromagnetic coupling between the read and write channels.

4. The system of claim 1, in which the crossfeed signal in the read channel comprises at least one of capacitively and inductively coupled components from the write channel.

5. The system of claim 1, in which the crossfeed simulator is triggered by presence of a signal in the write channel to send the inverse of the simulated crossfeed signal to the adder.

6. The system of claim 1, in which the crossfeed signal amplitude is the same order of magnitude as the read channel signal.

7. The system of claim 1, in which the simulator emulates the crossfeed signal to an error of less than 3%.

8. The system of claim 1, in which the read channel samples asynchronously with respect to timing of the read channel.

9. The system of claim 8, further comprising a waveform simulator filter, a read channel receiver, and an adder.

10. The system of claim 9, in which the read channel receiver comprises an asynchronously sampled receiver.

11. The system of claim 9, in which the waveform simulator comprises a finite impulse response (FIR) filter.

12. The system of claim 11, in which the FIR filter is adaptable.

13. The system of claim 12, in which the adaptable FIR filter is adjusted by a least mean squares algorithm which evaluates the read preamplifier signal when only the crossfeed signal is present.

14. The system of claim 9, in which the FIR comprises random access memory (RAM).

15. The system of claim 14, in which values in the RAM are set by a least mean squares algorithm which evaluates the read preamplifier signal when only the crossfeed signal is present.

16. The system of claim 9, in which the adder is digital.

17. The system of claim 9, in which the adder is analog.

18. A method of producing a valid read channel signal in a magnetic tape recording system, comprising:
    a) providing a write channel;
    b) providing a read channel which carries a linear composite signal of a valid read channel signal and an interfering signal present on the write channel;
    c) as triggered by the presence of a signal on the write channel, deriving a simulated crossfeed signal from the interfering signal present on the write channel; and
    d) combining the linear composite signal and an inverse of the simulated crossfeed signal to produce the valid read channel signal.

19. The method of claim 18, in which the magnetic recording system comprises a single bump head which in turn comprises a write gap and a read gap, the write channel is coupled to the write gap, and the read channel is coupled to the read gap.

20. The method of claim 19, in which the single bump head further comprises overlapping current conductors to reduce electromagnetic coupling between the read and write channels.

21. The method of claim 18, in which the crossfeed signal comprises at least one of capacitively and inductively coupled components from the write channel.

22. The method of claim 18, further comprising triggering the crossfeed simulator by presence of a signal in the write channel to send the inverse of the simulated crossfeed signal to the adder.

23. The method of claim 18, in which the crossfeed signal amplitude is the same order of magnitude as the read channel signal.

24. The method of claim 18, in which the step of deriving the simulated cross signal comprises emulating the crossfeed signal to an error of less than 3%.

25. The method of claim 18, further comprising asynchronously sampling by the read channel with respect to timing of the read channel.

26. The method of claim 25, in which the system further comprises a waveform simulator filter, a read channel receiver, and an adder.

27. The method of claim 26 in which the read channel receiver comprises an asynchronously sampled receiver.

28. The method of claim 26, in which the waveform simulator comprises a finite impulse response (FIR) filter.

29. The method of claim 28, in which the FIR filter is adaptable.

30. The method of claim 29, in which a least mean squares algorithm, which evaluates the read preamplifier signal when only the crossfeed signal is present, adjusts the adaptable FIR filter.

31. The method of claim 26, in which the FIR comprises random access memory (RAM).

32. The method of claim 31, in which a least mean squares algorithm, which evaluates the read preamplifier signal when only the crossfeed signal is present, sets values in the RAM.

33. The method of claim 26, in which the adder is digital.

34. The method of claim 26, in which the adder is analog.

* * * * *